(12) United States Patent
Egger et al.

(10) Patent No.: US 12,127,558 B2
(45) Date of Patent: Oct. 29, 2024

(54) SOLID FORMULATION OF INSECTICIDAL MIXTURES

(71) Applicants: Bayer Aktiengesellschaft, Leverkusen (DE); Bayer CropScience Aktiengesellschaft, Monheim am Rhein (DE)

(72) Inventors: Holger Egger, Cologne (DE); Reiner Fischer, Monheim (DE); Klaus Purbs, Lindlar (DE); Ramona Schiffer, Leverkusen (DE)

(73) Assignees: Bayer Aktiengesellschaft, Leverkusen (DE); Bayer CropScience Aktiengesellschaft, Monheim am Rhein (DE)

( * ) Notice: Subject to any disclaimer, the term of this patent is extended or adjusted under 35 U.S.C. 154(b) by 168 days.

(21) Appl. No.: 17/046,477

(22) PCT Filed: Apr. 12, 2019

(86) PCT No.: PCT/EP2019/059471
§ 371 (c)(1),
(2) Date: Oct. 9, 2020

(87) PCT Pub. No.: WO2019/197631
PCT Pub. Date: Oct. 17, 2019

(65) Prior Publication Data
US 2021/0161128 A1    Jun. 3, 2021

(30) Foreign Application Priority Data
Apr. 13, 2018    (EP) .................................... 18167281

(51) Int. Cl.
*A01N 25/14*    (2006.01)
*A01N 25/30*    (2006.01)
*A01N 43/90*    (2006.01)
*A01N 59/26*    (2006.01)

(52) U.S. Cl.
CPC ............. *A01N 25/14* (2013.01); *A01N 25/30* (2013.01); *A01N 43/90* (2013.01); *A01N 59/26* (2013.01)

(58) Field of Classification Search
CPC ........ A01N 25/14; A01N 25/30; A01N 43/90; A01N 59/26
See application file for complete search history.

(56) References Cited

U.S. PATENT DOCUMENTS

| 7,897,543 B2 | 3/2011 | Bretschneider et al. |
| 8,946,124 B2 * | 2/2015 | Fischer et al. ............ A61P 5/24 |
| | | 549/265 |
| 9,512,128 B2 | 12/2016 | Alig et al. |
| 2008/0305955 A1 | 12/2008 | Bretschneider et al. |
| 2010/0099717 A1 | 4/2010 | Ronald et al. |
| 2011/0190493 A1 | 8/2011 | Bretschneider et al. |
| 2015/0259345 A1 | 9/2015 | Muehlebach et al. |
| 2015/0344499 A1 | 12/2015 | Alig et al. |
| 2016/0000091 A1 | 1/2016 | Andersch et al. |
| 2016/0081342 A1 | 3/2016 | Popp et al. |
| 2016/0106095 A1 | 4/2016 | Popp et al. |
| 2019/0202837 A1 * | 7/2019 | Himmler .............. C07D 317/72 |

FOREIGN PATENT DOCUMENTS

| AU | 2006218154 A1 | 8/2006 | |
| CN | 104883885 A | 9/2015 | |
| CN | 104995193 A | 10/2015 | |
| DE | 60318259 T2 * | 12/2008 | ........... A01N 25/006 |
| JP | H06505256 A | 6/1994 | |
| JP | 2008531486 A | 8/2008 | |
| JP | 2010059151 A | 3/2010 | |
| JP | 2012511541 A | 5/2012 | |
| JP | 2017508778 A * | 3/2017 | ............. A01N 41/10 |
| JP | 2018/039745 A * | 3/2018 | |
| KR | 20100126516 A | 12/2010 | |
| KR | 20110094337 A | 8/2011 | |
| TW | 201626894 A * | 8/2016 | ............... A01C 1/06 |
| WO | 92012637 A1 | 8/1992 | |
| WO | WO-2003101197 A1 * | 11/2003 | ............. A01N 33/00 |
| WO | 2006089633 A2 | 8/2006 | |
| WO | 2007101546 A2 | 9/2007 | |
| WO | 2008036865 A2 | 3/2008 | |
| WO | 2008037379 A1 | 4/2008 | |
| WO | 2009115262 A1 | 9/2009 | |
| WO | 2010066780 A1 | 6/2010 | |
| WO | 2014096130 A1 | 6/2014 | |
| WO | WO-2014187846 A1 * | 11/2014 | ............. A01N 25/32 |
| WO | WO-2015140222 A1 * | 9/2015 | ............. A01N 43/56 |

OTHER PUBLICATIONS

TW 201626894 A, Aoki, Pest Controlling Agent Composition For Agri-horticulture And Use Thereof. Aug. 1, 2016. Translated (Year: 2016).*
JP 2017508778 A, Unknown, Active Ingredient Combination Having Insecticidal and Nematicidal Properties. Mar. 30, 2017. Translated (Year: 2017).*
Takao (JP 2018/039745 A). Translated. (Year: 2018).*
DE 60318259 T2, Parker, Pesticidal Compositions And Procedures. Dec. 4, 2008. Translated (Year: 2008).*
International Search Report for Application No. PCT/EP2019/059471 mailed May 17, 2019.
Cheng et al., "Studies of factors influencing the disintegration performance of pesticide water dispersible granules", J. Pesticide Science, Oct. 27, 2015, vol. 40, No. 4, pp. 191-199.

* cited by examiner

*Primary Examiner* — Robert A Wax
*Assistant Examiner* — John Seungjai Kwon
(74) *Attorney, Agent, or Firm* — McBee Moore & Vanik, IP, LLC

(57) ABSTRACT

The invention relates to solid formulations (especially water-dispersible granules) of tetramic acid derivatives and mixtures of these tetramic acid derivatives, to a process for production thereof and to the use thereof for application of the active ingredients present.

18 Claims, 2 Drawing Sheets

SOLID FORMULATION OF INSECTICIDAL MIXTURES

CROSS-REFERENCE TO RELATED APPLICATIONS

This application is the National Stage entry of International Application No. PCT/EP2019/059471, filed 12 Apr. 2019, which claims priority to European Patent Application No. 18167281.7, filed 13 Apr. 2018.

BACKGROUND

Field

The invention relates to solid formulations (especially water-dispersible granules) of tetramic acid derivatives and mixtures of these tetramic acid derivatives, to a process for production thereof and to the use thereof for application of the active ingredients present.

Description of Related Art

The production of WG formulations with the formulation auxiliaries specified in the prior art leads to formulations having unwanted properties. For instance, the low melting point of the active ingredient or active ingredient mixture leads to formation of large amounts of wet sieve residues that lead to blockage of the spray nozzles on later deployment of the spray liquor. Furthermore, the dispersed active ingredient(s) is/are often available only in a low concentration in solution and/or the uptake or penetration of the active ingredient(s) through the cuticle is inadequate.

SUMMARY

It has now been found that, surprisingly, the present formulations have particularly advantageous properties. For instance, only very small amounts of wet sieve residues form in their production, they can be efficiently extruded, and they have particularly high suspension stability, good suspendability and high bioavailability of the active ingredient, or good penetration through the cuticle.

It is a further feature of the formulations of the present invention that they also have good suspendability even at a high salt load, especially also after storage.

Accordingly, these formulations form the subject-matter of the present invention. The present invention further relates to a process for producing these water-dispersible granules and to the use thereof for application.

The invention therefore provides insecticidal solid compositions in the form of water-dispersible granules (solid formulations) preferably comprising:
a. as component a tetramic acid derivatives of the formula (I)

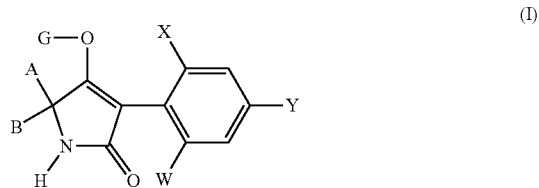

in which
W and Y are independently hydrogen, C1-C4-alkyl, chlorine, bromine, iodine or fluorine,
X is C1-C4-alkyl, C1-C4-alkoxy, chlorine, bromine or iodine,
A, B and the carbon atom to which they are bonded are C3-C6-cycloalkyl substituted by an optionally C1-C4-alkyl- or $C_1$-$C_4$-alkoxy-$C_1$-$C_2$-alkyl-substituted alkylenedioxy group that forms a 5-membered or 6-membered ketal together with the carbon atom to which it is bonded,
G is hydrogen (a) or is one of the groups

in which
E is a metal ion or an ammonium ion,
M is oxygen or sulfur,
R1 is straight-chain or branched C1-C6-alkyl,
R2 is straight-chain or branched C1-C6-alkyl.
b. at least one basic salt,
c. at least one dispersant,
d. at least one wetting agent,
e. at least one filler,
f. at least one structure former,
g. optionally a complexing agent,
h. optionally further active ingredients, and
i. optionally further customary adjuvants and formulation auxiliaries.

DETAILED DESCRIPTION OF A PREFERRED EMBODIMENT

Figure 1:
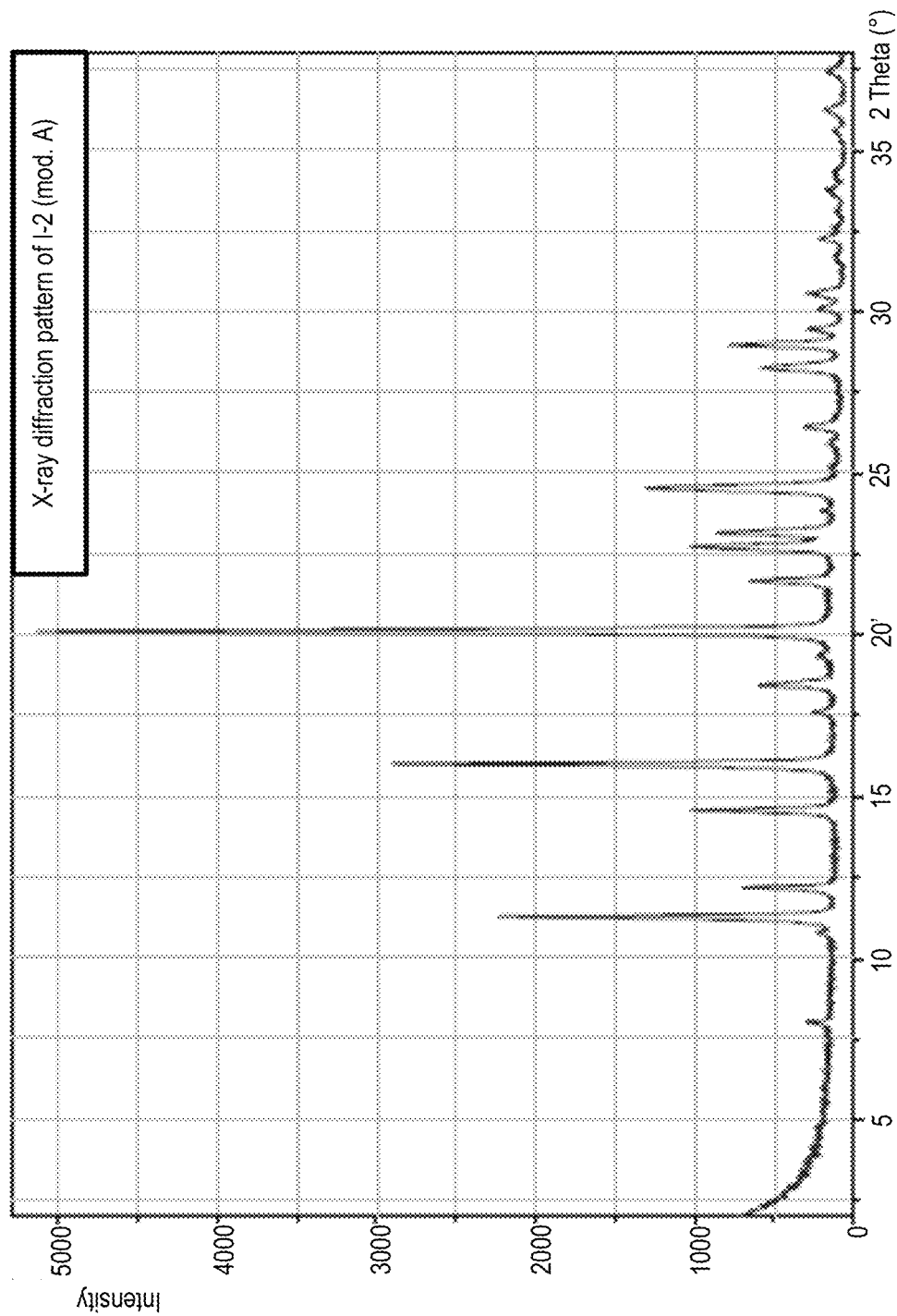
FIG. 1: X-ray diffraction pattern of I-2 (mod. A)

In the present invention, in formulae, e.g. formula (I), optionally substituted radicals, unless stated otherwise, may be mono- or polysubstituted, where the substituents in the case of polysubstitutions may be the same or different.

Moreover, ranges of preference stated in the present invention the different levels of preference should be understood such that they can be combined with one another in permutations, but in any case identical levels of preference and especially the most preferred embodiment/level of preference in each case are to be combined with one another and are indeed disclosed as such a combination.

Compositions as described above that consist solely of the essential components (not optional components) should likewise be considered to be disclosed.

Percentages—unless stated otherwise—should be regarded as percentages by weight, where the % by weight of the compositions should add up to 100.

Unless defined differently, "basic" in the context of the present invention means a pH in aqueous solution with pH>7.

The formulations according to the invention in aqueous dispersion have a pH of >7.

In a preferred embodiment, the formulations comprise at least one defoamer (i), preferably in solid form, preferably based on silicone oil or wax, further preferably a PDMS absorbed on a solid carrier.

The preferred defoamer is: Rhodorsil Antimousse EP6703 (absorbed polydimethylsiloxanes) from Solvay, a) Active Ingredient In a preferred embodiment, component a) in the compositions according to the invention is a compound of the formula (I)

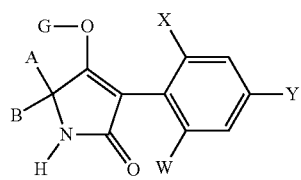

where the compounds of the formula (I) have the following definitions:

W is methyl,

X is chlorine or methyl,

Y is chlorine, bromine or methyl,

A, B and the carbon atom to which they are bonded are saturated C6-cycloalkyl substituted by an alkylenedioxy group which, together with the carbon atom to which it is bonded, forms a 5-membered or 6-membered ketal, G is hydrogen (a) or is one of the groups

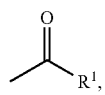 (b)

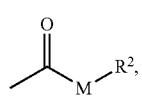 (c)

E, (d)

in which

M is oxygen,

E is one metal ion equivalent or an ammonium ion, $R^1$ is straight-chain or branched $C_1$-$C_4$-alkyl, $R^2$ is straight-chain or branched $C_1$-$C_4$-alkyl.

In a further-preferred embodiment, component a) in the compositions according to the invention is a compound of the formula (I)

(I)

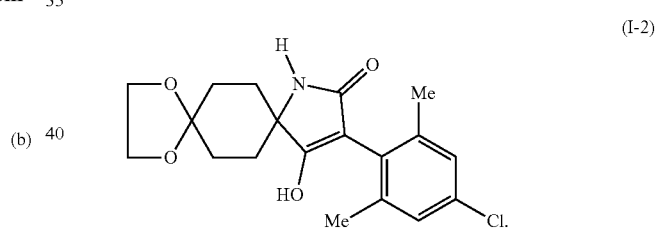

| W | X | Y | A | B |
|---|---|---|---|---|
| CH$_3$ | CH$_3$ | CH$_3$ | —(CH$_2$)$_2$—C—(CH$_2$)$_2$—  O—(CH$_2$)$_2$—O | |
| CH$_3$ | CH$_3$ | Cl | —(CH$_2$)$_2$—C—(CH$_2$)$_2$—  O—(CH$_2$)$_2$—O | |
| CH$_3$ | CH$_3$ | Br | —(CH$_2$)$_2$—C—(CH$_2$)$_2$—  O—(CH$_2$)$_2$—O | |
| CH$_3$ | CH$_3$ | CH$_3$ | —(CH$_2$)$_2$—C—(CH$_2$)$_2$—  O—(CH$_2$)$_3$—O | |
| CH$_3$ | CH$_3$ | Cl | —(CH$_2$)$_2$—C—(CH$_2$)$_2$—  O—(CH$_2$)$_3$—O | |
| CH$_3$ | CH$_3$ | Br | —(CH$_2$)$_2$—C—(CH$_2$)$_2$—  O—(CH$_2$)$_3$—O | |

In a particularly preferred embodiment, component a) is a compound of the formula (I-2)

b) Salt

Component b) is preferably selected from the group comprising inorganic basic ammonium salts.

Further preferably, b) is selected from the group comprising ammonium carbonate, ammonium hydrogencarbonate and diammonium hydrogenphosphate (DAHP).

More preferably, b) is DAHP.

c) Dispersant

Suitable dispersants in the context of the present invention are dispersants of the polycarboxylate type, for example those such as hydrophobically modified comb-like polymers, for example polyacrylic acid, polymethacrylic acid, polymaleic acid, polymaleic anhydride, a copolymer of maleic acid or maleic anhydride with an olefin (such as isobutylene or diisobutylene), a copolymer of acrylic acid and itaconic acid, a copolymer of methacrylic acid and itaconic acid, a copolymer of maleic acid or maleic anhydride and styrene, a copolymer of acrylic acid and methacrylic acid, a copolymer of acrylic acid and methacrylate, a copolymer of acrylic acid and vinyl acetate, a copolymer of styrene and methacrylic acid, modified copolymers of styrene and methacrylic acid, a copolymer of maleic acid or maleic anhydride and acrylic acid, an N-methyl fatty acid (e.g. $C_8$-$C_{18}$)-sarcosinate, a carboxylic acid such as a resin acid or a fatty acid (e.g. $C_8$-$C_{18}$) or a salt of such a carboxylic acid. The abovementioned copolymers may also be in the form of their salts, e.g. alkali metal salts (preferably Li, Na, K), alkaline earth metal salts (preferably Ca, Mg), ammonium or various amines.

Further preferred are dispersants from the group comprising sodium salts of the copolymers of maleic acid and olefins (e.g. Geropon T/36/Solvay; Duramax D-305/Dow); and sodium salts of copolymers of methacrylic acid and styrene (Tersperse 2700/Huntsman; Atlox Metasperse 500S/Croda).

The dispersant is more preferably a sodium salt of copolymers of methacrylic acid and styrene.

Suitable dispersants such as Tersperse 2700 are also described in WO 2008036865 A2.

d) Wetting Agents

Useful nonionic surfactants include all substances of this type which are typically usable in agrochemical compositions. Preferably mention may be made of polyethylene oxide-polypropylene oxide block copolymers, polyethylene glycol ethers of linear alcohols, reaction products of fatty acids with ethylene oxide and/or propylene oxide, and also polyvinyl alcohol, polyvinylpyrrolidone, copolymers of polyvinyl alcohol and polyvinylpyrrolidone, and copolymers of (meth)acrylic acid and (meth)acrylic esters, and additionally alkyl ethoxylates and alkylaryl ethoxylates, which optionally may be phosphated and optionally may be neutralized with bases, mention being made, by way of example, of sorbitol ethoxylates, and, as well, polyoxyalkylenamine derivatives.

Suitable anionic surfactants include all substances of this type that can typically be used in agrochemical compositions.

Useful wetting agents are preferably anionic surfactants selected from the group comprising salts of polystyrenesulfonic acids, salts of polyvinylsulfonic acids, salts of naphthalenesulfonic acid-formaldehyde condensation products, salts of condensation products of naphthalenesulfonic acid, phenolsulfonic acid and formaldehyde, and salts of lignosulfonic acid and sodium salts of alkylated naphthalenesulfonates, for example ®Morwet EFW, and the sodium salts of dioctylsulfosuccinic acid, for example ®Aerosol OTB, and block polymer of propylene oxide and ethylene oxide on ethylenediamine, for example ®Synperonic T 905.

Dispersants (d) that are further preferably suitable in the context of the present invention are wetting agents selected from the group of the sodium salts of alkylated naphthalenesulfonates, for example ®Morwet EFW, and the sodium salts of dioctylsulfosuccinic acid, for example ®Aerosol OTB, and more preferably consisting of the sodium salts of alkylated naphthalenesulfonates, preferably ®Morwet EFW.

e) Filler

Useful inert filler materials are all substances typically usable for this purpose in agrochemical compositions. Preference is given to inorganic particles, such as carbonates, silicates and oxides, and also organic substances, such as urea-formaldehyde condensates and celluloses (e.g. Ulmerweiss 6AL, Celite 209, Argirec B21 and B22, Bentone EW, Luz2 talc, Etiquette Violette). Examples include kaolin, rutile, silicon dioxide, finely divided silica, silica gels, and natural and synthetic silicates, and also talc.

The filler is further preferably selected from the group comprising kaolin, rutile and silicon dioxide. Particular preference is given to kaolin.

f) Structure Former

The formulations according to the invention may further comprise a structure former. Suitable for this purpose are particularly polyacrylic acid and salts thereof and especially crosslinked polyacrylates, and also polyurethanes and derivatized polyurethanes and salts thereof. Examples of such suitable acrylates are: (poly)methacrylate, (poly)methylmethacrylate, polyacrylamide, (poly)ethoxyethylmethacrylate, and Pergopak®M. Pergopak®M is a polymethylurea resin from Albemarle Corporation, Baton Rouge, LA, USA.

The structure former is more preferably a polymethylurea resin, especially Pergopak®M.

g) Complexing Agent

In the context of the present invention, all customary complexing agents are suitable, but the complexing agent is especially selected from the group comprising ethylenediaminetetraacetic acid, gluconic acid, nitrilotriacetic acid, diethylenetriaminepentaacetic acid, and salts and/or hydrates of the above or combinations thereof.

A particularly preferred complexing agent is $Na_4EDTA$ (tetrasodium ethylenediaminetetraacetate), for example Trilon® B Powder from BASF.

h) Further Active Ingredients

The formulation may in principle comprise one or more further active agrochemical ingredients, preferably selected from the group of the insecticides, herbicides, fungicides and host defence inductors.

Further preferred active ingredients are one or more selected from the group of the insecticides, even further preferably from the group comprising imidacloprid, nitenpyram, acetamiprid, thiacloprid, thiamethoxam, clothianidin, cyantraniliprole, chlorantraniliprole, flubendiamid, tetraniliprole, cyclaniliprole; spirodiclofen, spiromesifen, spirotetramat, abamectin, acrinathrin, chlorfenapyr, emamectin, ethiprole, fipronil, flonicamid, flupyradifuron, indoxacarb, metaflumizone, methoxyfenozid, milbemycin, pyridaben, pyridalyl, silafluofen, spinosad, sulfoxaflor, triflumuron.

Particular preference is given to one or more further active ingredients selected from the group comprising ethiprole and flupyradifurone.

i) Adjuvants and Formulation Aids

Useful foam inhibitors are all substances typically usable for this purpose in agrochemical compositions. Preference is given to silicone oil-based defoamers and magnesium stearate.

Particular preference is given to polydimethylsiloxane absorbed on a solid substrate. One example is Rhodorsil Antimousse EP 6703.

Useful preservatives include all substances which are typically usable for this purpose in agrochemical compositions of this type. Examples includes Preventol® (from Lanxess AG) and Proxel®.

Useful antioxidants are all substances typically usable for this purpose in agrochemical compositions. Preference is given to butylhydroxytoluene.

Useful dyes are all substances typically usable for this purpose in agrochemical compositions. Examples include titanium dioxide, pigment black, zinc oxide and blue pigments, and also Permanent Red FGR.

In a preferred embodiment, the invention provides an insecticidal solid composition in the form of water-dispersible granules comprising:

a. compounds of the formula (I)

where the compounds of the formula (I) have the following definitions:

W is methyl,

X is chlorine or methyl,

Y is chlorine, bromine or methyl,

A, B and the carbon atom to which they are bonded are saturated C6-cycloalkyl substituted by an alkylenedioxy group which, together with the carbon atom to which it is bonded, forms a 5-membered or 6-membered ketal, G is hydrogen (a) or is one of the groups (b)

$$\underset{R^1}{\overset{O}{\|}}$$

(c)

$$\underset{M^{R^2}}{\overset{O}{\|}}$$

(d)

E, in which

M is oxygen,

E is one metal ion equivalent or an ammonium ion, $R^1$ is straight-chain or branched C1-C4-alkyl, $R^2$ is straight-chain or branched $C_1$-$C_4$-alkyl.

b. at least one inorganic basic ammonium salt, c. at least one dispersant of the polycarboxylate type, d. at least one anionic wetting agent, e. at least one inert filler, f. at least one structure former, g. at least one complexing agent, h. optionally further active insecticidal ingredients, i. optionally further adjuvants.

In a further-preferred embodiment, the invention provides an insecticidal solid composition in the form of water-dispersible granules comprising:

a. compound of the formula (I) selected from the following compounds:

(I)

| W | X | Y | A | B |
|---|---|---|---|---|
| CH$_3$ | CH$_3$ | CH$_3$ | —(CH$_2$)$_2$—C—(CH$_2$)$_2$— O—(CH$_2$)$_2$—O | |
| CH$_3$ | CH$_3$ | Cl | —(CH$_2$)$_2$—C—(CH$_2$)$_2$— O—(CH$_2$)$_2$—O | |
| CH$_3$ | CH$_3$ | Br | —(CH$_2$)$_2$—C—(CH$_2$)$_2$— O—(CH$_2$)$_2$—O | |
| CH$_3$ | CH$_3$ | CH$_3$ | —(CH$_2$)$_2$—C—(CH$_2$)$_2$— O—(CH$_2$)$_3$—O | |
| CH$_3$ | CH$_3$ | Cl | —(CH$_2$)$_2$—C—(CH$_2$)$_2$— O—(CH$_2$)$_3$—O | |
| CH$_3$ I) | CH$_3$ | Br | —(CH$_2$)$_2$—C—(CH$_2$)$_2$— O—(CH$_2$)$_3$—O | | b. at least one inorganic basic ammonium salt selected from the group comprising ammonium carbonate, ammonium hydrogencarbonate and diammonium hydrogenphosphate (DAHP), c. at least one dispersant of the polycarboxylate type selected from the group comprising hydrophobically modified comb-like polymers comprising polyacrylic acid, polymethacrylic acid, polymaleic acid, polymaleic anhydride, a copolymer of maleic acid or maleic anhydride with an olefin, a copolymer of acrylic acid and itaconic acid, a copolymer of methacrylic acid and itaconic acid, a copolymer of maleic acid or maleic anhydride and styrene and modified copolymers of maleic acid or maleic anhydride and styrene, a copolymer of acrylic acid and methacrylic acid, a copolymer of styrene and methacrylic acid, modified copolymers of styrene and methacrylic acid, a copolymer of acrylic acid and methacrylate, a copolymer of acrylic acid and vinyl acetate, a copolymer of maleic acid or maleic anhydride and acrylic acid, an N-methyl fatty acid (e.g. $C_8$-$C_{18}$)-sarcosinate, a carboxylic acid such as a resin acid or a fatty acid (e.g. $C_8$-$C_{18}$) or a salt of such a carboxylic acid, and the salts of these copolymers, d. at least one anionic wetting agent selected from the group consisting of the sodium salts of alkylated naphthalenesulfonates and the sodium salts of dioctylsulfosuccinic acid, e. at least one inert filler selected from the group comprising carbonates, silicates and oxides, and also urea-formaldehyde condensates and celluloses, f. at least one structure former selected from the group comprising polyacrylic acid and salts thereof, cross-linked polyacrylates and polyureas, polyurethanes and derivatized polyureas and polyurethanes, g. at least one complexing agent selected from the group comprising ethylenediaminetetraacetic acid (EDTA), glutaconic acid, nitrilotriacetic acid, diethylenediaminepentaacetic acid, and salts and/or hydrates of these compounds, h. optionally further active insecticidal ingredients,
i. optionally further adjuvants.

In a particularly preferred embodiment, the invention provides an insecticidal solid composition in the form of water-dispersible granules comprising:

a. compound having the formula (I-2) having the following structure:

(I)

(I-2)

[Chemical structure showing a compound with formula I-2: a spirocyclic dioxolane fused to a cyclohexane bearing a pyrrolinone ring (with NH, C=O, OH) attached to a 2,6-dimethyl-4-chlorophenyl group]

b. at least one inorganic basic ammonium salt selected from the group comprising diammonium hydrogensulfate (DAHP),
c. at least one dispersant selected from the group comprising sodium salts of copolymers of methacrylic acid and styrene and modified copolymers of methacrylic acid and styrene,
d. at least one anionic wetting agent selected from the group consisting of the sodium salts of alkylated naphthalenesulfonates,
e. at least one inert filler selected from the group comprising kaolin, rutile and silicon dioxide,
f. at least one structure former selected from the group comprising polymethylurea resins,
g. at least one complexing agent selected from the group comprising EDTA and the salts and hydrates thereof, especially the tetrasodium salt,
h. optionally further active insecticidal ingredients,
i. optionally further adjuvants.

In an alternative embodiment, in the abovementioned embodiments, a further active insecticidal ingredient (g) is necessarily present, preferably selected from the group comprising imidacloprid, nitenpyram, acetamiprid, thiacloprid, thiamethoxam, clothianidin, cyantraniliprole, chlorantraniliprole, flubendiamid, tetraniliprole, cyclaniliprole; spirodiclofen, spiromesifen, spirotetramat, abamectin, acrinathrin, chlorfenapyr, emamectin, ethiprole, fipronil, flonicamid, flupyradifuron, indoxacarb, metaflumizone, methoxyfenozid, milbemycin, pyridaben, pyridalyl, silafluofen, spinosad, sulfoxaflor, triflumuron; more preferably from the group comprising ethiprole and flupyradifuron.

In an alternative embodiment, a further adjuvant is necessarily present in the abovementioned embodiments, preferably a silicone oil-based defoamer, further preferably polydimethylsiloxane absorbed on a solid substrate.

Solo Formulations:

The proportion of the active ingredient (component a/compounds of the formula I/I-2) in the compositions according to the invention with just one active ingredient is
preferably 0.1-25% by weight,
further preferably 2-10% by weight, and
more preferably 4-8% by weight.

The proportion of the salt (component b) in the compositions according to the invention with just one active ingredient is
preferably 20-75% by weight,
further preferably 50-68% by weight, and
more preferably 60-66% by weight.

The proportion of the dispersant (component c) in the compositions according to the invention with just one active ingredient is
preferably 1-20% by weight,
further preferably 5-15% by weight, and
more preferably 8-12% by weight.

The proportion of the wetting agent (component d) in the compositions according to the invention with just one active ingredient is
preferably 0.5-15% by weight,
further preferably 1-10% by weight, and
more preferably 1.5-2.5% by weight.

The proportion of the filler (component e) in the compositions according to the invention with just one active ingredient is
preferably 0.5-70% by weight,
further preferably 5-25% by weight, and
more preferably 10-22% by weight.

The proportion of the structure former (component f) in the compositions according to the invention with just one active ingredient is
preferably 0.5-15% by weight,
further preferably 1-10% by weight, and
more preferably 3-8% by weight.

The proportion of the complexing agent (component g) in the compositions according to the invention with just one active ingredient is
preferably 0-10% by weight,
further preferably 0.1-2% by weight, and
more preferably 0.1-1% by weight.

The proportion of the further adjuvants (component i)—if present—in the compositions according to the invention is
preferably 0-10% by weight,
further preferably 0-8% by weight, and
more preferably 0-5% by weight.

If component i) is necessarily present in the alternative embodiment, for example as defoamer, the proportion thereof in the solid formulations of the invention is 0.1-5% by weight.

A preferred embodiment of the invention is compositions comprising components
a) 0.1-25% by weight
b) 20-75% by weight
c) 1-20% by weight
d) 0.5-15% by weight
e) 0.5-70% by weight
f) 0.5-15% by weight
g) 0-10% by weight.

A further-preferred embodiment of the invention is compositions comprising components
a) 2-10% by weight
b) 50-68% by weight
c) 5-15% by weight
d) 1-10% by weight
e) 5-25% by weight
f) 1-10% by weight
g) 0.1-2% by weight.

An even further-preferred embodiment of the invention is compositions comprising components
a) 4-8% by weight
b) 60-66% by weight c) 8-12% by weight
d) 1.5-2.5% by weight
e) 10-22% by weight
f) 3-8% by weight
g) 0.1-1% by weight.

In an alternative embodiment in which component i) is necessarily present, preference is given to a solid composition containing components in
a) 4-8% by weight
b) 60-66% by weight
c) 8-12% by weight
d) 1.5-2.5% by weight
e) 10-22% by weight
f) 3-8% by weight
g) 0.1-1% by weight
i) 0.1-5% by weight.

Mixture Formulations:

The proportion of the active ingredient (component a/compounds of the formula I/I-2) in the compositions according to the invention is
preferably 1-10% by weight,
further preferably 1-7% by weight, and
more preferably 1.5-5% by weight.

The proportion of the salt (component b) in the compositions according to the invention is
preferably 20-75% by weight,
further preferably 30-60% by weight, and
more preferably 30-50% by weight.

The proportion of the dispersant (component c) in the compositions according to the invention is
preferably 1-20% by weight,
further preferably 5-15% by weight, and
more preferably 8-12% by weight.

The proportion of the wetting agent (component d) in the compositions according to the invention is
preferably 0.5-15% by weight,
further preferably 1-10% by weight, and
more preferably 1.5-2.5% by weight.

The proportion of the filler (component e) in the compositions according to the invention is
preferably 0.5-70% by weight,
further preferably 5-25% by weight, and
more preferably 10-22% by weight.

The proportion of the structure former (component f) in the compositions according to the invention is
preferably 0.5-15% by weight,
further preferably 1-10% by weight, and
more preferably 3-8% by weight.

The proportion of the complexing agent (component g) in the compositions according to the invention is
preferably 0-10% by weight,
further preferably 0.1-2% by weight, and
more preferably 0.1-1% by weight.

The proportion of the active ingredients (component h)—if present—in the compositions according to the invention is
preferably 1-60% by weight,
further preferably 10-40% by weight, and
more preferably 10-35% by weight.

The proportion of the further adjuvants (component i)—if present—in the compositions according to the invention is
preferably 0-10% by weight,
further preferably 0-8% by weight, and
more preferably 0-5% by weight.

If component i) is necessarily present in the alternative embodiment, for example as defoamer, the proportion thereof in the solid formulations of the invention is 0.1-5% by weight.

Usable with specific preference in the aforementioned compositions are tetramic acid derivatives of the abovementioned formula (I) with G=hydrogen (a).

Likewise most preferably usable are tetramic acid derivatives of the formula (I) mentioned above where G=E (d).

Compound I-2 is preferably used in the form of its most thermodynamically stable polymorphous structure. This crystal structure and further physical data were determined as follows:

Sample Preparation:

Compound I-2 ($C_{19}H_{22}ClNO_4$/MW=363.84 g/mol) was crystallized from methanol and dried at room temperature, giving modification A.

Modification A of I-2 can be characterized by x-ray powder diffractometry based on the corresponding diffraction diagrams that were recorded at 25° C. and with Cu-Kα 1 radiation (1.5406 Å) (FIG. 1).

Modification A according to the present invention shows at least 3, preferably at least 5, further preferably at least 7, even further preferably at least 10 and most preferably all reflections as shown in FIG. 1 and table 2a). Table 2b) shows all the measured reflections of modification A:

Modification A according to the present invention is further characterized by the x-ray diffraction diagram shown in Figure I.

Crystallographic studies on single crystals of modification A showed that the crystal structure is monoclinic. The unit cell has the $P2_1/c$ space group.

TABLE 2

| Crystallographic properties of modification A | |
|---|---|
| Parameter | Modification A |
| Crystal system | monoclinic |
| Space group | $P2_1/c$ |
| a in Å | 11.66544(14) |
| b in Å | 9.50603(10) |
| c in Å | 16.66907(19) |
| α | 90 |
| β | 110.2045(13) |
| γ | 90 |
| Z | 4 |
| Density (calculated) | 1.393 g/cm$^3$ | a, b, c = length of the sides of the unit cell
α, β, γ = angles of the unit cell
Z = number of molecules in the unit cell TABLE 2a/b

| Crystallographic data/reflections [°2theta] of modification A | |
|---|---|
| 2a Reflections [°2theta] Modification A | 2b Reflections [°2theta] Modification A |
| 11.3 | 8.0 |
| 14.6 | 10.8 |
| 16.0 | 11.3 |
| 20.1 | 12.2 |
| 21.7 | 14.6 |
| 22.7 | 16.0 |
| 23.1 | 17.6 |
| 24.5 | 18.4 |
| 28.2 | 19.4 |

TABLE 2a/b-continued

Crystallographic data/reflections [°2theta] of modification A

| 2a Reflections [°2theta] Modification A | 2b Reflections [°2theta] Modification A |
|---|---|
| 29.0 | 20.1 |
|  | 21.7 |
|  | 22.7 |
|  | 23.1 |
|  | 23.8 |
|  | 24.5 |
|  | 25.9 |
|  | 26.4 |
|  | 28.2 |
|  | 29.0 |
|  | 29.4 |
|  | 30.1 |
|  | 30.6 |
|  | 32.2 |
|  | 36.2 |
|  | 37.4 |
|  | 38.2 |
|  | 39.1 |

Figure 2:
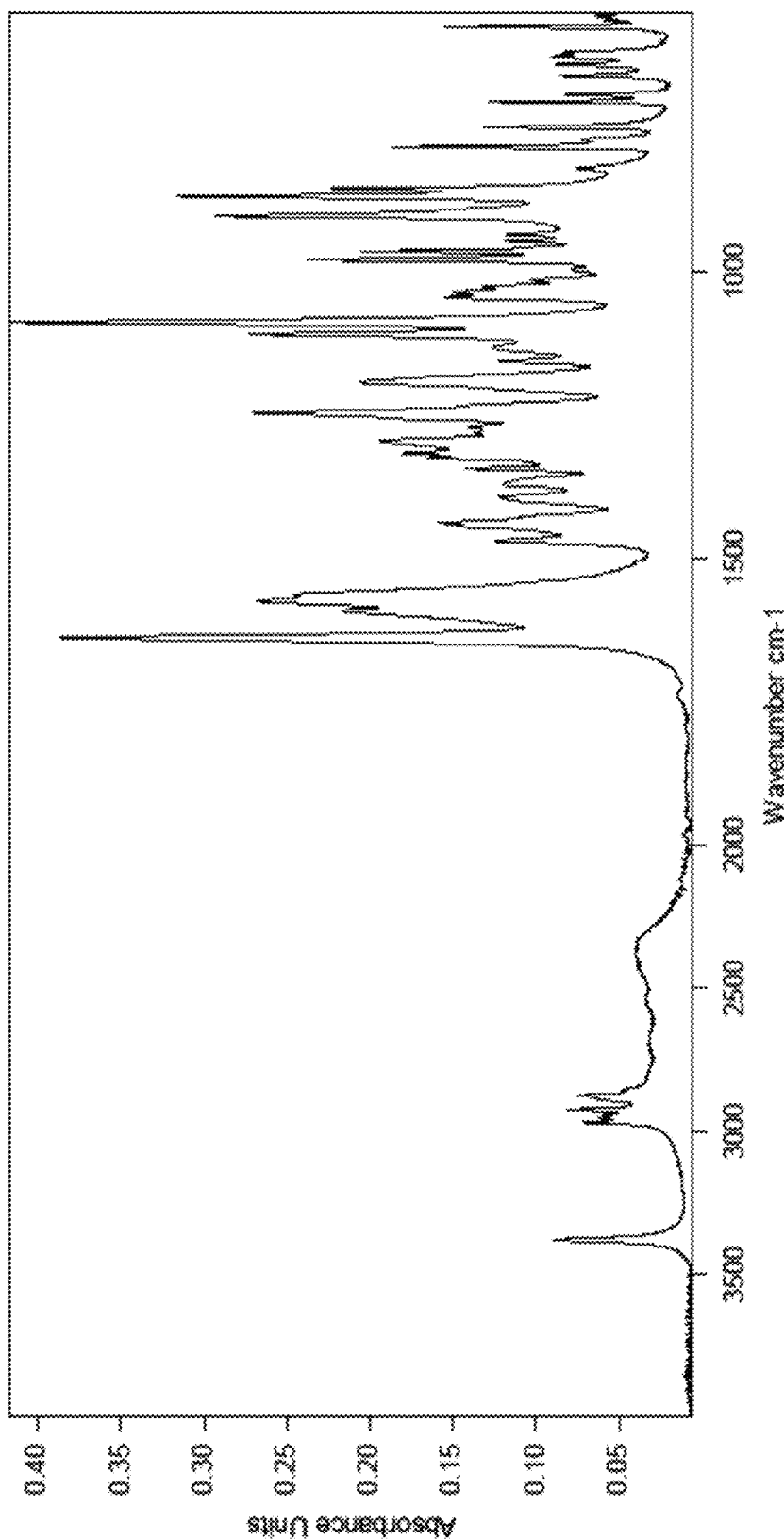
FIG. 2: IR Spectrum

The polymorphic form of modification A of I-1 can be determined by IR spectroscopy from the corresponding spectrum which was recorded at 25° C. using a diamond ATR instrument at a resolution of 4 cm$^{-1}$ (FIG. 2). Modification A of the present invention shows at least 3, preferably at least 5, further preferably at least 7 and more preferably all bands as can be seen in FIG. 2 and as described in table 2c.

TABLE 2c)

IR bands [cm$^{-1}$]

| Band maxima [cm$^{-1}$] Modification A | Band maxima [cm$^{-1}$] |
|---|---|
| 3378 | 1133 |
| 2969 | 1109 |
| 2955 | 1088 |
| 2943 | 1045 |
| 2924 | 1036 |
| 2876 | 1027 |
| 2858 | 1015 |
| 2326 | 997 |
| 1637 | 980 |
| 1592 | 965 |
| 1575 | 946 |
| 1564 | 936 |
| 1470 | 903 |
| 1444 | 869 |
| 1438 | 856 |
| 1428 | 821 |
| 1394 | 783 |
| 1372 | 769 |
| 1344 | 748 |
| 1325 | 704 |
| 1317 | 691 |
| 1297 | 659 |
| 1272 | 639 |
| 1247 | 625 |
| 1194 | 573 |
| 1157 | 563 |
|  | 553 |

In addition to the above-described modification A, compound I-2 may be present in further polymorphous forms and also pseudopolymorphous forms (hydrates, solvates, etc.).

The application rate of the formulations according to the invention can be varied within a relatively wide range. It is guided by the respective active ingredients and by the content thereof in the compositions.

With the aid of the compositions according to the invention, the insecticidal active ingredient mixtures can be deployed in a particularly advantageous manner on plants and/or their habitat.

The compositions according to the invention can be used to treat all plants and parts of plants. Plants in this context are understood to include all plants and plant populations, such as desired and unwanted wild plants or crop plants (including naturally occurring crop plants). Crop plants may be plants which can be obtained by conventional breeding and optimization methods or by biotechnological and genetic engineering methods or combinations of these methods, including the transgenic plants and including the plant cultivars which are protectable or non-protectable by plant breeders' rights. Parts of plants shall be understood to mean all parts and organs of the plants above and below ground, such as shoot, leaf, flower and root, examples given being leaves, needles, stalks, stems, flowers, fruit bodies, fruits and seeds, and also tubers, roots and rhizomes. Plant parts also include harvested material and vegetative and generative propagation material, for example cuttings, tubers, rhizomes, shoots and seeds.

Preferably, the compounds of the formula (I) are used in the formulations according to the invention by spray application, but also after drench, dip or drip application, against animal pests from the following pest families:

Preference is given from the family of the woolly aphids (Pemphigidae) to: *Eriosoma* spp., *Pemphigus* spp., in crops such as, for example, citrus fruit, pomaceous fruit, stone fruit, leaf vegetables, root and tuber vegetables and ornamental plants.

Preference is given from the family of the grape lice (Phylloxeridae) to: *Phylloxera* spp. in grapevines, nuts, citrus fruit.

Preference is given from the family of the jumping plant lice (Psyllidae) to: *Psylla* spp., *Paratrioza* spp., *Tenalaphara* spp., *Diaphorina* spp., *Trioza* spp., in crops such as, for example, pomaceous fruit, stone fruit, citrus fruit, vegetables, potatoes, in tropical crops.

Preference is given from the family of the soft scales (Coccidae) to: *Ceroplastes* spp., *Drosicha* spp., *Pulvinaria* spp., *Protopulminaria* spp., *Saissetia* spp., *Coccus* spp., in perennial crops such as, for example, citrus fruit, pomaceous fruit, stone fruit, olives, grapevines, coffee, tea, tropical crops, ornamental plants, vegetables.

Preference is given from the family of the armoured scale insects (Diaspididae) to: *Quadraspidiotus* spp., *Aonidiella* spp., *Lepidosaphes* spp., *Aspidiotus* spp., *Aspis* spp., *Diaspis* spp., *Parlatoria* spp., *Pseudaulacaspis* spp., *Unaspis* spp., *Pinnaspis* spp., *Selenaspidus* spp., in crops such as, for example, citrus fruit, pomaceous fruit, stone fruit, almonds, pistachios, nuts, olives, tea, ornamental plants, grapevines, tropical crops.

Preference is given from the family of the ensign scales (Ortheziidae) to: *Orthezia* spp. in citrus fruit, pomaceous fruit, stone fruit.

Preference is given from the family of the mealy bugs (Pseudococcidae) to: *Pericerga, Pseudococcus* spp., *Planococcus* spp., *Dysmicoccus* spp., in crops such as, for example, citrus fruit, stone fruit and pomaceous fruit, tea, grapevines, vegetables, ornamental plants and tropical crops.

Preference is furthermore given from the family of the whiteflies (Aleyrodidae) to: *Bemisia tabaci, Bemisia argentifolii, Trialeurodes vaporariorum, Aleurothrixus floccosus, Aleurodes* spp., *Dialeurodes* spp., *Parabemisia myricae* in crops such as, for example, vegetables, melons, potatoes, tobacco, soft fruit, citrus fruit, ornamental plants, cotton, soya beans and tropical crops.

Moreover, preference is given from the family of the aphids (Aphidae) to:

*Myzus* spp. in tobacco, stone fruit, soft fruit, fruit vegetables, leafy vegetables, tuber and root vegetables, melons, potatoes, ornamental plants, spices,

*Acyrthosiphon onobrychis* in vegetables,

*Aphis* spp. in tobacco, citrus fruit, pomaceous fruit, stone fruit, melons, strawberries, soft fruit, fruit vegetables, leafy vegetables, tuber, stem and root vegetables, ornamental plants, potatoes, pumpkins, spices,

*Rhodobium porosum* in strawberries,

*Nasonovia ribisnigri* in leafy vegetables,

*Macrosiphum* spp. in ornamental plants, potatoes, leafy vegetables and fruit vegetables, strawberries,

*Phorodon humuli* in hops,

*Brevicoryne brassicae* in leafy vegetables,

*Toxoptera* spp. in citrus fruit, stone fruit, almonds, nuts, spices,

*Aulacorthum* spp. in citrus fruit, potatoes, fruit vegetables and leafy vegetables,

*Anuraphis cardui* in vegetables,

*Brachycaudus helycrisii* in sunflowers,

*Acyrthosiphon onobrychis* in vegetables.

Likewise, preference is given from the family of the *thrips* (Thripidae) to: *Anaphothrips* spp., *Baliothrips* spp., *Caliothrips* spp., *Frankliniella* spp., *Heliothrips* spp., *Hercinothrips* spp., *Rhipiphorothrips* spp., *Scirtothrips* spp., *Kakothrips* spp., *Selenothrips* spp. and *Thrips* spp., in crops such as, for example, fruit, cotton, grapevines, tea, nuts, tropical crops, ornamental plants, conifers, tobacco, spices, vegetables, soft fruit, melons, citrus fruit and potatoes.

Moreover, preference is given from the families of the leaf-miner flies (Agromyzidae) and root-maggot flies (Anthomyiidae) to: *Agromyza* spp., *Amauromyza* spp., *Atherigona* spp., *Chlorops* spp., *Liriomyza* spp., *Oscinella* spp., *Pegomyia* spp. in crops such as, for example, vegetables, melons, potatoes, nuts, ornamental plants.

Preference is given from the families of the leafhoppers (Cicadellidae) and planthoppers (Delphacidae) to: *Circulifer* spp., *Dalbus* spp., *Empoasca* spp., *Erythroneura* spp., *Homalodisca* spp., *Iodioscopus* spp., *Laodelphax* spp., *Nephotettix* spp., *Nilaparvata* spp., *Oncometopia* spp., *Sogatella* spp., in crops such as, for example, citrus fruit, fruit, grapevines, potatoes, vegetables, ornamental plants, conifers, melons, soft fruit, tea, nuts, rice and tropical crops.

Preference is given from the family of the leaf-miner moths (Gracillariidae) to:

*Caloptilia* spp., *Gracillaria* spp., *Lithocolletis* spp., *Leucoptera* spp., *Phtorimaea* spp., *Phyllocnistis* spp. in crops such as pomaceous fruit, stone fruit, grapevines, nuts, citrus fruit, conifers, potatoes, coffee.

Preference is given from the family of the gall midges (Cecidomyiidae) to:

*Contarinia* spp., *Dasineura* spp., *Diplosis* spp., *Prodiplosis* spp., *Thecodiplosis* spp., *Sitodiplosis* spp., *Haplodiplosis* spp. in crops such as citrus fruit, pomaceous fruit, stone fruit, vegetables, potatoes, spices, soft fruit, conifers, hops.

Likewise, preference is given from the family of the fruit flies (Tephritidae) to:

*Anastrepha* spp., *Ceratitis* spp., *Dacus* spp., *Rhagoletis* spp. in crops such as vegetables, soft fruit, melons, pomaceous and stone fruit, ornamental plants, potatoes, grapevines, tropical crops, citrus fruit, olives.

Moreover, preference is given to mites from the families of the spider mites (Tetranychidae) and the gall mites (Eriophydae):

*Tetranychus* spp., *Panonychus* spp., *Aculops* spp. in crops such as vegetables, potatoes, ornamental plants, citrus fruit, grapevines, conifers.

The inventive treatment of the plants and parts of plants with the compositions according to the invention is effected directly or by allowing the combinations to act on the surroundings, environment or storage space by the customary treatment methods, for example by drenching, immersion, spraying, evaporation, fogging, scattering, painting on and, in the case of propagation material, in particular in the case of seeds, also by applying one or more coats.

The active ingredient is preferably applied by spray application. Alternatively, the active ingredient is applied by drench, drip or dip application.

Preferably, the plant to be treated is selected from the group consisting of cotton, soya beans, tobacco, vegetables, spices, ornamental plants, conifers, citrus plants, fruit, tropical crops, nuts and grapevines.

Preferably, the composition according to the invention acts against pests from the families of the woolly aphids, grape lice, jumping plant lice, soft scales, armoured scale insects, ensign scales, mealy bugs, whiteflies, aphids, *thrips*, leafhoppers, planthoppers, leaf-miner flies, gall midges, fruit flies, leaf-miner moths, spider mites, gall mites.

It has also been found that the compositions according to the invention can be produced by moistening a pulverulent mixture consisting of the active ingredient(s) and the formulation auxiliaries, then granulating by means of low-pressure extrusion and then drying the moist granules. Relevant equipment for the moistening, extrusion and drying is known to those skilled in the art. In the course of production, it should especially be ensured that the temperatures to which the product is exposed are kept lower than 60° C. and preferably lower than 50° C. in all process steps.

This process too forms part of the subject-matter of the invention.

The inventive treatment of the plants and parts of plants with the compositions according to the invention is effected directly or by allowing the combinations to act on the surroundings, environment or storage space by the customary treatment methods, for example by dipping, spraying, evaporation, fogging, scattering, painting on and, in the case of propagation material, in particular in the case of seeds, also by applying one or more coats.

The examples which follow illustrate the subject-matter of the invention without limiting it.

EXAMPLES

1. Suspendability 1.a) Suspendability of a Solo Formulation

To achieve good suspendability at high salt concentration in the formulation, the following dispersing aids were tested as follows:

20 g of a mixture of 0.96 g of compound I-2, 13 g of diammonium hydrogenphosphate (DAHP), 0.4 g of Morwet EFW (wetting agent), 1 g of Pergopak M, 0.1 g of Trilon B Powder, 2.54 g of Kaolin W and 2 g of dispersing aid were ground in an IKA A 10 analysis mill (20 000 rpm) for 2 min and tested for gravimetric suspendability.

| Dispersing aid | Visual assessment | Suspendability, initial |
|---|---|---|
| Agrilan 789 Dry | good | 99.1 |
| Geropon Ultrasperse | good | 98.2 |
| Tersperse 2700 | good | 98.1 |
| Atlox Metasperse 550 S | good | 98.0 |
| Narlex D-72 | good | 98.0 |
| Geropon TA/72 | good | 98.8 |
| Versa-TL3 | good | 97.6 |
| Geropon T36 | good | 96.7 |
| Tersperse 2020 | good | 73.4/81 |
| Supragil MNS/90 | good/sediment | 72.1 |
| Borresperse CA | good/sediment | 88 |
| Rhodacal BX78 | flocculates readily | 87.2 |
| Reax 88B | flocculates | 72.6 |
| Polyfon O | flocculates | 70.3 |

Determination of Suspendability

A 1% suspension in water (CIPAC C) is dispersed in a 250 ml measuring cylinder. The mixture is equilibrated for 30 minutes. Subsequently, the upper 9/10 of the suspension is removed. The remaining 1/10 is dried and the residue is determined gravimetrically. Suspendability is defined as:

10/9*100*(amount of sample [g]*proportion a.i. [%]/100−residue [g])/(amount of sample [g]*proportion a.i. [%]/100)

Thus, a value of 100% corresponds to a homogeneous distribution of all insoluble constituents throughout the sample volume.

A good visual assessment means no sediment and no flocculation.

1.b) Suspendability and Stability of Solo & Mixed Formulation

Suspendability experiments on solo and mixed formulation after storage at elevated temperature.

1 kg of a mixture of compound 1-2 (different in example 12), optionally a second active ingredient, diammonium hydrogenphosphate (DAHP), Morwet EFW, Pergopak M, optionally Trilon B Powder, Kaolin W, dispersing aid and defoamer, in the manner known to the person skilled in the art, is ground in a Hosokawa 100 AS 4" air-jet mill (injector air 5.5 bar, grinding air 4.5 bar, throughput 100 g/min), moistened with water (about 14% by weight) and extruded using a Fuji Paudal dome extruder (die size 0.8 mm) to give a WG, and dried further in a fluidized bed dryer.

2. Producibility 2.a) Experiments on the Granulation Method

Preparation of a WG by means of extrusion as a suitable granulation method by lower thermal stress.

a) A mixture of COMPOUND 1-2, a second active ingredient, diammonium hydrogenphosphate (DAHP), Morwet EFW, Pergopak M, Trilon B Powder, Kaolin W and dispersing aid, in the manner known to the person skilled in the art, is ground in a Hosokawa 100 AS 4" air-jet mill (injector air 5.5 bar, grinding air 4.5 bar, throughput 100 g/min), moistened with water (about 14% by weight) and extruded using a Fuji Paudal dome extruder (die size 1 mm) to give a WG, and dried further in a fluidized bed dryer.

b) A mixture of COMPOUND 1-2, DAHP, Geropon T36, Geropon SDS, Trilon B Powder and Reax 88A is dispersed in water to give a 50% slurry, ground in the manner known to the person skilled in the art with a bead mill and then dried by means of spray drying (Niro SD 6.3 spray dryer) or by means of a fluidized bed granulator (Niro Aeromatic MP1).

| Sample | 13 | 14 (comparative) | 15 (comparative) |
|---|---|---|---|
| Compound I-2/[g] | 48 | 1200 | 48 |
| DAHP/[g] | 600 | 18112.5 | 744.5 |
| Morwet EFW/[g] | 20 | | |
| Geropon T 36/[g] | | 125 | 5 |
| Geropon SDS/[g] | | 62.5 | 2.5 |
| Pergopak M/[g] | 50 | | |
| Trilon B Powder/[g] | 20 | 500 | |
| Kaolin W/[g] | 162 | | |
| Tersperse 2700/[g] | 100 | | |
| Reax 88 A/[g] | | 5000 | 200 |
| Reax 88 B/[g] | | | |
| Production method | Extrusion | Spray drying | Fluidized bed |
| pH of 1% dispersion | 7.7 | 6.7 | 6.7 |

By means of spray drying or fluidized bed, the pH of the spray liquor falls too far (<7).

2.b) Optimization of the Extrudability of the WG

A mixture of COMPOUND 1-2, a second active ingredient, Morwet EFW, Pergopak M, optionally Trilon B Powder, Tersperse 2700, DAHP and optionally Kaolin W, in the manner known to the person skilled in the art, is ground in a Hosokawa 100 AS 4" air-jet mill (injector air 5.5 bar, grinding air 4.5 bar, throughput 100 g/min), moistened with water (about 14% by weight) and extruded using a Fuji

| Sample | 1 | 1a | 2 | 3 | 4 | 5 | 6 | 6a | 7 | 8 | 8a | 9 | 10 | 11 | 12 |
|---|---|---|---|---|---|---|---|---|---|---|---|---|---|---|---|
| I-2 [g] | 48 | 48 | 48 | 24 | 18 | 18 | 36 | 24 | 24 | 18 | 24 | 18 | 48 | 48 | 0.72 |
| Ethiprole/[g] | | | 300 | 150 | 150 | 300 | 300 | | | | | | | | |
| Flupyradifurone/[g] | | | | | | | | | 100 | 150 | 150 | 150 | | | |
| DAHP/[g] | 650 | 650 | 650 | 300 | 521 | 521 | 353 | 365 | 500 | 456 | 440 | 456 | 650 | 650 | 9.75 |
| Morwet EFW/[g] | 20 | 20 | 20 | 20 | 20 | 20 | 20 | 20 | 20 | 20 | 20 | 20 | 20 | 20 | 0.3 |
| Pergopak M/[g] | 50 | 50 | 50 | 50 | 50 | 50 | 50 | 50 | 50 | 50 | 50 | 50 | 50 | 50 | 0.75 |
| Trilon B Powder/[g] ( ) | 5 | 5 | 5 | 20 | 5 | 5 | 5 | 5 | 5 | 5 | 5 | 5 | 5 | 5 | |
| Kaolin W/[g] | 127 | 117 | 127 | 136 | 136 | 136 | 136 | 126 | 201 | 201 | 201 | 201 | 127 | 127 | 1.76 |
| Tersperse 2700/[g] | 100 | 100 | | 150 | 100 | | 100 | 100 | 100 | 100 | 100 | | | | 1.5 |
| Atlox Metasperse 550 S/[g] | | | 100 | | | 100 | | | | | | 100 | | | |
| Versa-TL 3/[g] | | | | | | | | | | | | | 100 | | |
| Agrilan 789 Dry/[g] | | | | | | | | | | | | | | 100 | |
| Rhodorsil Antimousse EP 6703 | | 10 | | | | | 10 | | | 10 | | | | | |
| Visual assessment | good | good | good | good | good | good | good | good | good | good | good | good | good | good | good |
| Suspend., init./[%] | 98.8 | 98.2 | 98.2 | 99.0 | 97.6 | 98.0 | 97.7 | 97 | 94.1 | 97.4 | 96.4 | 96.7 | 98.2 | 98.7 | 98.4 |
| Suspend. 2W 54° C./[%] | 99.3 | 98.3 | 98.7 | 98.9 | 97.8 | 97.5 | 97.5 | 96.5 | 97.4 | 97.2 | 96.5 | 96.9 | kA | kA | kA |

Paudal dome extruder (die size 0.8 or 1 mm) to give a WG, and dried further in a fluidized bed dryer.

|  | Sample | | | | | | | | |
|---|---|---|---|---|---|---|---|---|---|
|  | 16 | 17 | 18 = 12 | 19 | 20 (comparative) | 21 (comparative) | 22 = 3 | 23 (comparative) | 24 |
| 147/[g] | 48 | 48 | 48 | 48 | 48 | 48 | 24 | 24 | 24 |
| Ethiprole/[g] |  |  |  |  |  |  | 300 |  |  |
| Flupyradifurone/[g] |  |  |  |  |  |  |  | 100 | 100 |
| DAHP/[g] | 500 | 550 | 600 | 650 | 700 | 762 | 300 | 500 | 300 |
| Morwet EFW/[g] | 20 | 20 | 20 | 20 | 20 | 20 | 20 | 20 | 20 |
| Pergopak M/[g] | 50 | 50 | 50 | 50 | 50 | 50 | 50 | 50 | 50 |
| Trilon B Powder/[g] |  | 20 | 20 | 20 | 20 | 20 | 20 | 20 | 5 |
| Kaolin W/[g] | 282 | 212 | 162 | 112 | 62 |  | 136 | 136 | 351 |
| Tersperse 2700/[g] | 100 | 100 | 100 | 100 | 100 | 100 | 150 | 150 | 150 |
| Process Assessment | extr. good | extr. good | extr. good | extr. good | extr. poor | extr. no extrudate | extr. good | extr. no extrudate | extr. good |
| pH of 1% dispersion | 7.7 | 7.6 | 7.7 | 7.7 | 7.7 | — | 7.4 | — | 7.5 |

As apparent from comparative examples 20 and 21, no extrudates or no extrudates in adequate quality can be obtained in the case of an insufficient amount of filler or too great an amount of salt.

Example 22 shows that the optimal content of filler has to be adjusted in the case of an active ingredient combination.

3) Solubility of the Active Ingredient

Attempts to increase the availability of the active ingredient in the spray liquor by improving the solubility as a function of the amount of salt.

6 samples of sample 19 (see example 2b) were dispersed in 50 g of water, such that concentrations of 0.12 or 0.24 g of active ingredient/l were achieved. The mixtures were stirred and, in each case after 30 min, 2 h and 5 h, centrifuged completely, and the proportion of dissolved active ingredient in the supernatant was determined by means of HPLC.

|  | 30 min | 2 hours | 5 hours |
|---|---|---|---|
| 0.12 g of active ingredient/l | 91.2% | 94.6% | 96.2% |
| 0.24 g of active ingredient/l | 87.5% | 92.1% | 98.3% |

There is virtually complete solubility of the active ingredient in the spray liquor only by virtue of the formulations according to the invention.

4) Bioavailability

Measurement of Penetration into the Plant

In this test, the penetration of active ingredients though enzymatically isolated cuticles of apple tree leaves was measured.

Leaves which had been cut off in the fully developed state from apple trees of the Golden Delicious variety were used. The cuticles were isolated by
  first filling leaf discs that had been marked with dye on the underside and punched out with a pectinase solution (0.2% to 2%) buffered to a pH between 3 and 4 by means of vacuum infiltration,
  then adding sodium azide and
  then leaving the leaf discs thus treated to stand until dissolution of the original leaf structure and until the detachment of the noncellular cuticle.

Thereafter, only the cuticles of the upper leaf sides which were free of stomata and hairs were used in the further procedure. They were repeatedly washed alternately with water and a buffer solution of pH 7. The clean cuticles obtained were finally applied to Teflon sheets and smoothed and dried with a gentle air stream.

In the next step, the cuticle membranes thus obtained were placed into stainless steel diffusion cells (=transport chambers) for membrane transport studies. For this purpose, the cuticles were positioned using tweezers centrally onto the edges of the diffusion cells which had been smeared with silicone grease and sealed with a ring which had likewise been greased. The arrangement was selected such that the morphological outer side of the cuticles was directed outward, i.e. toward the air, while the original inner side faced the interior of the diffusion cell.

The diffusion cells were filled with a 30% ethylene glycol/water solution. To determine the penetration, 10 μl in each case of a spray liquor of the composition below were applied to the outside of the cuticle. The spray liquor was made up with local tap water of moderate water hardness.

After the application of the spray liquors, the water was allowed to evaporate, the chambers were inverted and they were placed in thermostated tanks in which the temperature and air humidity above the cuticle were adjustable via a gentle air flow onto the cuticle bearing the spray deposit (20° C., 60% rh). Aliquots were taken by an autosampler at regular intervals and the active ingredient content was determined by HPLC.

The experimental results are shown in the table below. The numbers reported are average values from 8 to 10 measurements.

Sample 1 and a comparative sample (sample 25) with the same concentration of ammonium dihydrogenphosphate (ADHP) rather than DAHP were analysed.

Application rate 0.1 g a.i./l, +3 g/l RME, temperature 30° C., air humidity 56%, stirring time 24 h

|  | pH | 0 h | 12 h | 24 h |
|---|---|---|---|---|
| Sample 1 | 7.8 | 0% | 72% | 79% |
| Sample 25 (comparative) | 6.5 | 0% | 23% | 37% |

As sample 25 shows, at a pH<7, penetration of the active ingredient/bioavailability is no longer sufficient, or these are distinctly lowered. The pH and hence the use of a basic salt and thus has a crucial effect on AI penetration.

Materials Used

Kraftsperse® EDF-350, ® DD-5, Kraftsperse® DD-8, Kraftsperse® DW-8, Kraftsperse® EDF-450, Reax® 88B and Reax® 907 are lignosulfonates from Ingevity, North Charleston, SC, USA.

Geropon® TA/72, T/36 is a polycarboxylic acid sodium salt from Solvay.

Oparyl® MT 804 is a dibutylnaphthalenesulfonic acid sodium salt from Giovanni Bozzetto S.p.A., Filago, Italy.

Oparyl® DT 530 is a naphthalenesulfonic acid-formaldehyde condensate, sodium salt from Giovanni Bozzetto S.p.A., Filago, Italy. Pergopak® M is a polymethylurea resin from Albemarle Corporation, Baton Rouge, LA, USA.

Rhodorsil® EP 6703 is a polydimethylsiloxane on starch from Rhodia, Boulogne, France.

Celite® 209 S is a diatomaceous earth from Lehmann & Voss, Hamburg, Germany.

Luzenac 2 talc is a magnesium hydrosilicate from Luzenac Europe, Paris, France.

Kaolin W is an aluminium hydrosilicate from Erbslöh Lohrheim GmbH & Co. KG, Lohrheim, Germany.

Borrespersе® Na and Ufoxane® 3 A are lignosulfonates from Borregaard, Sarpsborg, Norway.

Morwet® D 425 is a naphthalenesulfonic acid-formaldehyde condensate, sodium salt from Akzo Nobel, Stenungsund, Sweden.

Terspersе® a is naphthalenesulfonic acid-formaldehyde condensate, sodium salt from Huntsman, The Woodlands, Texas, USA.

Baykanol® SL is an alkylarylsulfonate from Lanxess, Leverkusen, Germany.

Rhodorsil Antimousse EP 6703® is an absorbed polydimethylsiloxane, Solvay.

The invention claimed is:

1. Solid composition in the form of water-dispersible granules comprising:
   a) tetramic acid derivative of formula (I-2)

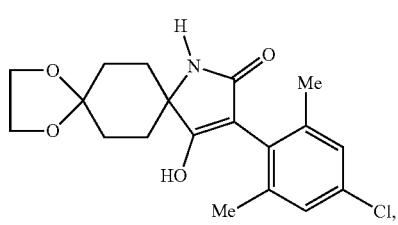

b) 20% to 65% by weight of diammonium hydrogenphosphate (DAHP),
   c) 1% to 20% by weight of at least one dispersant selected from the group consisting of polyacrylic acid, polymethacrylic acid, polymaleic acid, polymaleic anhydride, a copolymer of maleic acid or maleic anhydride with an olefin, a copolymer of acrylic acid and itaconic acid, a copolymer of methacrylic acid and itaconic acid, a copolymer of acrylic acid and methacrylic acid, a copolymer of acrylic acid and methacrylate, a copolymer of acrylic acid and vinyl acetate, a copolymer of methacrylic acid and styrene, a modified copolymer of methacrylic acid and styrene, a copolymer of maleic acid or maleic anhydride and acrylic acid, an N-methyl fatty acid-sarcosinate, and salts thereof,
   d) 0.5% to 15% by weight of at least one wetting agent selected from the group consisting of sodium salts of alkylated naphthalenesulfonates and sodium salts of dioctylsufosuccinic acid,
   e) 10% to 70% by weight of at least one filler which is a silicate,
   f) 0.5% to 15% by weight of at least one structure former selected from the group consisting of crosslinked polyureas, polyurethanes, and derivatized polyureas and polyurethanes,
   g) optionally a complexing agent,
   h) optionally one or more further active ingredients, and
   i) optionally one or more further adjuvants and formulation auxiliaries.

2. Composition according to claim 1, wherein component c) is a dispersant from the group consisting of sodium salts of the copolymers of maleic acid and olefins, sodium salts of copolymers of methacrylic acid and styrene, and modified copolymers of methacrylic acid and styrene.

3. Composition according to claim 1, wherein component d) is a sodium salt of an alkylated naphthalenesulfonate.

4. Composition according to claim 1, wherein component e) is kaolin.

5. Composition according to claim 1, wherein component f) is a polymethylurea resin.

6. Composition according to claim 1, wherein component g) is Na$_4$EDTA.

7. Composition according to claim 1, wherein component h) is selected from the group consisting of imidacloprid, nitenpyram, acetamiprid, thiacloprid, thiamethoxam, clothianidin, cyantraniliprole, chlorantraniliprole, flubendiamid, tetraniliprole, cyclaniliprole; spirodiclofen, spiromesifen, spirotetramat, abamectin, acrinathrin, chlorfenapyr, emamectin, ethiprole, fipronil, flonicamid, flupyradifuron, indoxacarb, metaflumizone, methoxyfenozid, milbemycin, pyridaben, pyridalyl, silafluofen, spinosad, sulfoxaflor, and triflumuron.

8. Composition according to claim 1, comprising the compound having formula (I-2) having the following structure:

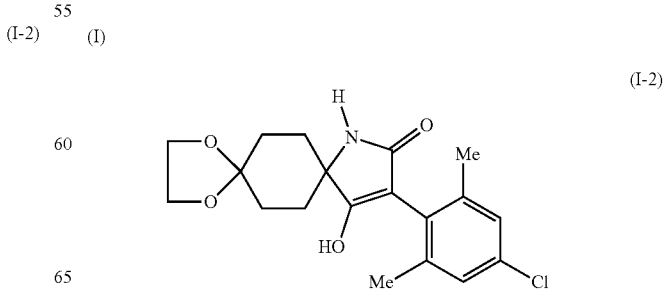

b. at least one inorganic basic ammonium salt which is diammonium hydrogensulfate (DAHP),
c. at least one dispersant selected from the group consisting of sodium salts of copolymers of methacrylic acid and styrene,
d. at least one anionic wetting agent selected from the group consisting of sodium salts of alkylated naphthalenesulfonates,
e. at least one inert filler which is kaolin,
f. at least one structure former which is a polymethylurea resin,
g. at least one complexing agent selected from the group consisting of EDTA and the salts and hydrates thereof,
h. optionally one or more further active insecticidal ingredients,
i. optionally one or more further adjuvants.

9. Solid composition in the form of water-dispersible granules comprising:
a) 4-8% by weight
b) 60-65% by weight
c) 8-12% by weight
d) 1.5-2.5% by weight
e) 10-22% by weight
f) 3-8% by weight
g) 0.1-1% by weight.

10. Composition according to claim 1, wherein component h) is present in an amount of 10-35% by weight.

11. Composition according to claim 1, wherein component i) is present in an amount of 0.1-5% by weight.

12. Process for producing a composition according to claim 1, comprising mixing the components and then extruding the mixed components.

13. A method for controlling insects on one or more plants and/or a habitat thereof comprising applying a composition according to claim 1 to the one or more plants and/or habitat thereof.

14. An insecticidal product comprising a composition according to claim 1.

15. Composition according to claim 1, wherein the copolymer of maleic acid or maleic anhydride with an olefin in component c) is a copolymer of maleic acid or maleic anhydride and styrene.

16. Composition according to claim 1, wherein the N-methyl fatty acid-sarcosinate in component c) is N-methyl-(C8-C18) fatty acid-sarcosinate.

17. Composition according to claim 1, wherein component h) is selected from the group consisting of ethiprole and flupyradifuron.

18. Composition according to claim 8, wherein component g) is a tetrasodium salt of EDTA.

* * * * *